United States Patent
Anstett

[19]

[11] Patent Number: 6,139,238
[45] Date of Patent: *Oct. 31, 2000

[54] FASTENER FOR LAMINATE FLOORING

[75] Inventor: David A. Anstett, Algonquin, Ill.

[73] Assignee: Powernail Co., Lincolnshire, Ill.

[ * ] Notice: This patent is subject to a terminal disclaimer.

[21] Appl. No.: 09/338,329

[22] Filed: Jun. 22, 1999

Related U.S. Application Data

[62] Division of application No. 09/137,359, Aug. 20, 1998, Pat. No. 5,971,688.

[51] Int. Cl.[7] .............................. F16B 15/00; F16B 15/06
[52] U.S. Cl. ................................... 411/451.1; 411/451.3; 411/456; 411/488
[58] Field of Search ............................ 411/451.1, 451.3, 411/488, 489, 456, 442, 443

[56] References Cited

U.S. PATENT DOCUMENTS

| | | | |
|---|---|---|---|
| 386,404 | 7/1888 | Jones | 411/488 |
| 1,092,351 | 4/1914 | Garrity | 411/451.3 |
| 2,215,205 | 9/1940 | Biernacki . | |
| 2,428,259 | 9/1947 | Anstett . | |
| 2,593,647 | 4/1952 | Anstett . | |
| 2,649,831 | 8/1953 | Anstett . | |
| 2,868,057 | 1/1959 | Anstett . | |
| 3,099,108 | 7/1963 | Kalkbrenner | 50/71 |
| 4,809,849 | 3/1989 | Kozyrski et al. | 206/343 |
| 5,060,797 | 10/1991 | Sygnator | 206/345 |

FOREIGN PATENT DOCUMENTS 271161  1/1930  Italy .................................. 411/451.1

*Primary Examiner*—Neill Wilson
*Attorney, Agent, or Firm*—Wallenstein & Wagner, Ltd.

[57] ABSTRACT

A cost-effective fastener of the driven type used in strip nail or magazine fed nailing machines with specific useful features for securing laminate flooring. Generally, the fastener has a thickness of between about 0.035 inch and 0.050 inch. The fastener has a shank of rectangular cross-section with a score formed in one side. The score reduces the size of dimples cause by driving the fastener into the flooring. The score also provides for quick identification of the fastener and facilitates removal of the fastener's head.

13 Claims, 2 Drawing Sheets

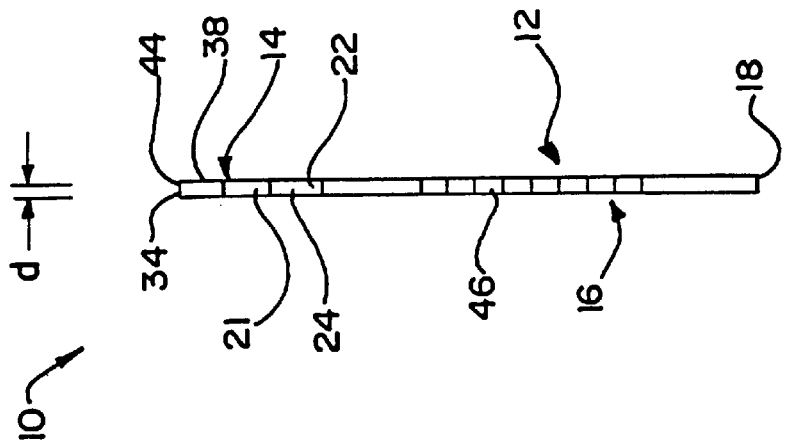
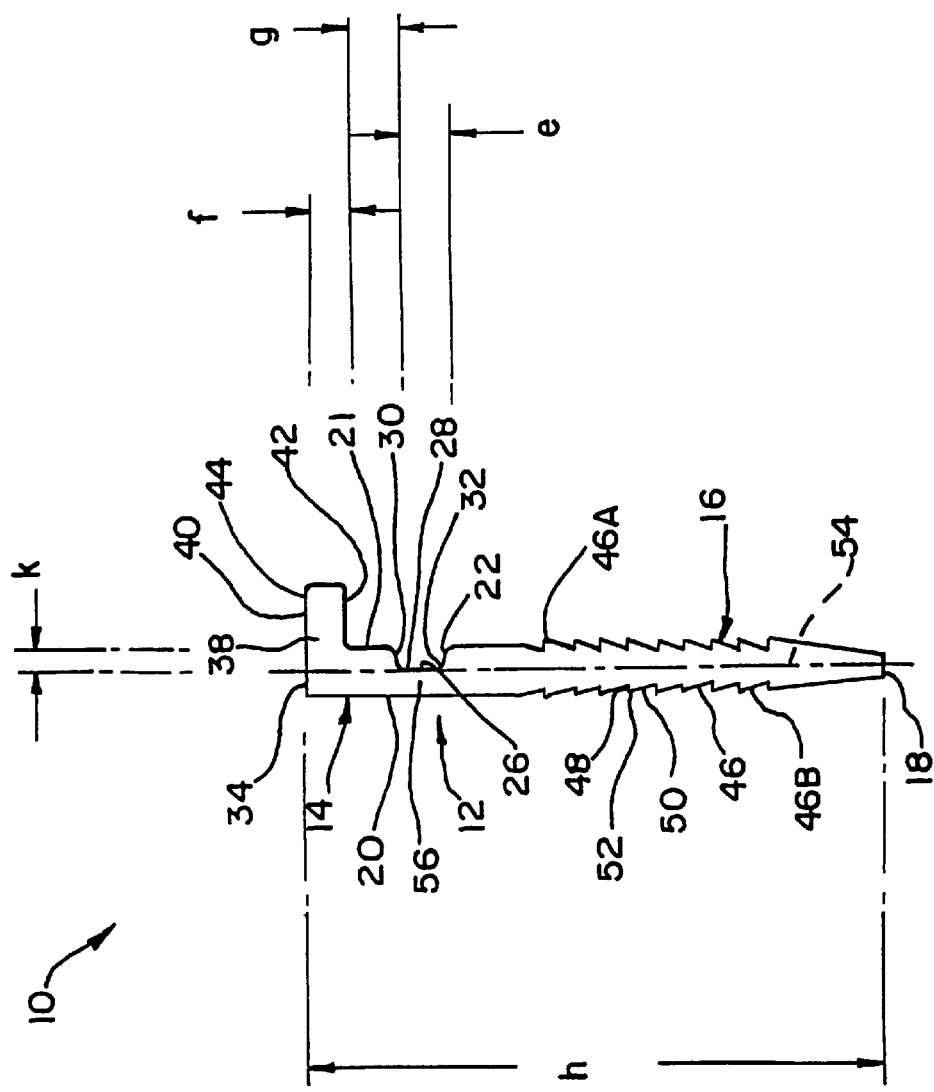

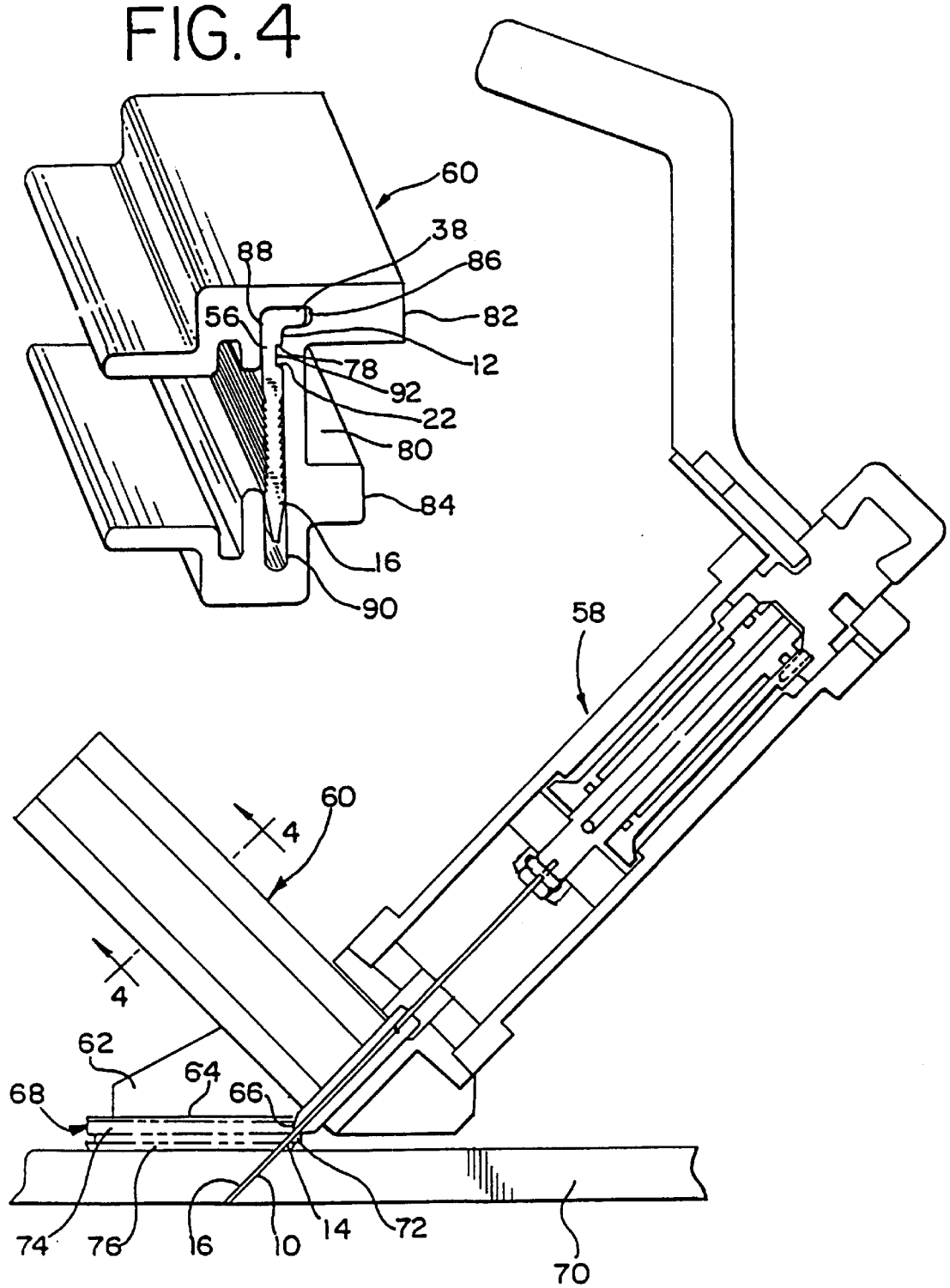

FASTENER FOR LAMINATE FLOORING

RELATED APPLICATIONS

This Application is a divisional of co-pending U.S. patent application Ser. No. 09/137,359 filed Aug. 20, 1998, upon which a claim of priority is based

TECHNICAL FIELD

The present invention generally relates to fasteners used for securing flooring workpieces, and in particular to a cost-effective fastener that can be driven into a tongued laminate flooring workpiece without causing substantial disfigurement and allowing for easy modification if not properly sunk.

BACKGROUND ART

Fasteners stamped or blanked from cold rolled steel sheets and formed into sticks or strips for continuous or magazine feeding of a plunger-type nailing machine are well known in the art. Examples of such fasteners are exemplified in U.S. Pat. Nos. 2,649,831, 2,868,057 and 2,428,259, the disclosures of which are incorporated in their entirety by reference herein. Such fasteners, more commonly termed cleats or nails, can be used to install tongue and groove wood flooring and other fibrous workpieces.

As disclosed in the foregoing patents, such fasteners are characterized by having a shank of preselected width that is substantially rectangular in cross-section. Extending perpendicularly in one direction from one end of the shank is a fastener head. The L-shaped configuration defined by the joining of the fastener head to the shank provides a surface for driving the fastener into a workpiece as well as providing the fastener with holding or fastening properties.

On an other end of these fasteners is a tapered tip for initially penetrating the workpiece. Projecting from at least one side of the shank and extending from generally an intermediate position along the shank, to nearly the tip, is a plurality of barbs, In common practice, the barbs are formed on each side of the shank in corresponding pairs.

Today, there are many tongue and groove floorings being introduced into the marketplace. Most of these new floorings are typically comprised of two or more layers and are referred to as "Engineered Flooring" or, alternatively, as "Laminate Flooring." This type of flooring can have various thicknesses of ½, ⅜, and 5/16 inch. For convenience this flooring shall generally be referred to herein as laminate flooring.

The tongue of laminate flooring is usually comprised of plain LUAN, cheap wood, or wood composites. These materials have very little strength for retaining a fastener.

Conventional fasteners used to install laminate flooring typically have a thickness of about 1.6 millimeters (0.062 inch). Driving these fasteners into the fragile tongue of a laminate flooring workpiece results in a high occurrence of splitting.

Moreover, driving a conventional fastener into the tongue deposits large dimples on the tongue's outer surface due to the displacement of the laminate flooring material. These dimples can inhibit or prevent the proper installation of the tongue within the groove of an adjacent laminate flooring workpiece.

Further, if the head of a conventional fastener is not properly sunk within the laminate flooring material, the fastener must be completely removed or special steps must be taken to further sink the fastener by using a punch or the like. Both of these options are time consuming and can result in damage to the flooring, especially the tongue.

Hence, prior to the present invention, a need existed for a cost-effective fastener that can be driven into a laminate flooring workpiece without causing substantial disfigurement and allowing for easy corrective measures for remedying an improperly sunk fastener.

SUMMARY OF THE INVENTION

According to the present invention, a cost-effective fastener of the driven type utilized in a strip or magazine fed nailing machine has been developed with specific useful features for securing laminate flooring. As a result, the fastener reduces the size of dimples caused by driving the fastener into flooring material. Also, if the fastener is not properly sunk within the flooring, the fastener can be modified without causing appreciable damage to the flooring.

Generally, the fastener of the present invention includes a shank of preselected length and thickness. The shank has a substantially rectangular cross-section with a shaft segment and a tapered segment. Formed within the shaft segment is a notch or score. Integrally attached and perpendicularly extending from the shaft segment is a head member of preselected length. Opposite from the head member at the distal end of the tapered segment is a tip for penetrating a workpiece. Projecting from at least one side of the tapered segment are a plurality of barbs that extend from generally an intermediate position along one side of the shank to nearly the tip of the fastener.

Other advantages and features of the present invention will be apparent from the following description of a specific embodiment illustrated in the accompanying drawings.

BRIEF DESCRIPTION OF DRAWINGS

FIG. 1 is an enlarged plan view of a fastener in accordance with the present invention having a shank with a score formed therein and a head member perpendicularly extending from the proximal end of the shank;

FIG. 2 is a side or edge view of the fastener shown in FIG. 1 depicting the score and the terminal end of the head member;

FIG. 3 is a partial fragmentary side view of a nailer including a clip for containing a plurality of fasteners shown in FIGS. 1–2 wherein one of the fasteners is driven into both a flooring workpiece and a subfloor; and FIG. 4 is an enlarged perspective cross-sectional view of the clip of FIG. 3 taken long plane 4—4 with a plurality of the fasteners of FIGS. 1–2 received within the clip.

DETAILED DESCRIPTION

While this invention is susceptible of embodiments in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

Referring now to the drawings, and particularly to FIGS. 1 and 2, a fastener 10 is disclosed which is also commonly termed a cleat or nail. Fastener 10 is stamped or blanked from sheet metal stock such as cold rolled steel. The fastener 10 includes a unitary shank 12 having a shaft segment 14 and an opposite tapered segment 16 that extends from generally an intermediate position along the shank to distal tip 18.

Both the shaft segment 14 and the tapered segment 16 are preferably rectangular in cross-section and have a uniform cross-sectional thickness "d."

The shaft 14 has two substantially parallel coplanar side walls 20,21. Formed within side wall 21 is a notch or score 22 that projects into the shaft segment 14. The score 22 defines a concave inner surface 24 within the shaft 14. Preferably, the concave surface 24 has an apex 26 that projects into the shaft 14 by a distance of about 1.4 millimeters (0.055 inch) with respect to outer wall 21.

As shown in FIG. 1, the concave surface includes an inner wail 28 and two intermediate walls 30,32. The inner wall 28 is preferably coplanar with shaft side walls 20 and 21. Further, the intermediate walls 30,32 are symmetrical in shape with respect to each other, integrally extend from the ends of the score inner wall 28 to side wall 21, and are spaced by a distance "e" of about 3.2 millimeters (0.125 inch) from each other. The intermediate walls 30,32 can be arcuate as shown in FIGS. 1–2 or, alternatively, planar.

As will be appreciated by those skilled in the art, the concave outer surface 24 can have other shapes such as that of a parallelogram, semicircle, or V-shaped. Accordingly, surface 24 should not be limited to the shape of the score 22 shown in FIGS. 1 and 2.

The shaft segment 14 of the shank 12 includes a proximal or striking end 34. Conversely, the tapered segment 16 of the shank 12 includes penetrating distal end or tip 18. Integrally attached to shaft 14 and proximate to the striking end 34 is a head member 38 having a pair of coplanar walls 40,42 spaced apart from each other by a distance "f" of about 2.54 millimeters (0.100 inch). The striking end 34 of shank 12, together with wall 40 of the head member 38, provide a planar surface 44 suitable for striking, and thus driving, the fastener 10 into a flooring workpiece or the like.

Lower wall 42 of the head member 38 preferably extends perpendicularly in one direction from one side wall of the shank 12. It is desirable that the head member 38 extend perpendicularly from side wall 21 having score 22 formed therein. This reduces the size of dimples cause by driving the fastener 10 into a flooring workpiece. In particular, this structure enables a portion of the flooring workpiece material displaced by the head member 38 to enter into the score 22. In an embodiment, intermediate wall 30 is spaced by a distance "g" of about 3.2 millimeters (0.125 inch) from the lower wall 42 of the head member 38.

As indicated previously, at the other end of the shank 12 opposite the striking end 34 is a tip 18 that penetrates a workpiece in a manner disclosed in U.S. Pat. No. 2,649,831. The tip 18 is at the distal end of tapered segment 16 which also includes a plurality of outwardly extending barbs 46 on at least one side of the shank 12. In a preferred embodiment and as disclosed in FIG. 1, barbs 46 are positioned along each side of the shank tapered segment 14, thereby defining barb pairs. The spacing between upper barb pairs 46A is widest whereas the spacing between lower barb pairs 46B is narrowest. As a result, a gradual and uniform taper is defined from barb pair 46A through barb pair 46B.

Each barb 46 has a back edge 48, a forward edge 50, and an outer tip 52 at the intersection between the edges. The outer tip 52 of each barb 46 is preferably spaced from the longitudinal axis 54 of the tapered segment 16 by a distance that is about equal to or less than the distance of the side wall 20 from the longitudinal axis 54. Accordingly, when the faster 10 is driven into a flooring workpiece, the forward edge 50 of each barb 46 begins penetration into the workpiece before the barb's corresponding back edge 48.

As shown in FIG. 1, the back edge 48 of each barb 46 is at a right angle with the longitudinal axis 54 of the tapered segment 16. In alternative embodiments, the back edge 48 can be at various angles relative to a line extending along the longitudinal axis 54 and towards the tip 18 of the shank 12. For example, the angle can be at sixty (60) degrees.

The side walls 20 and 21 of the shaft segment 14 are parallel to longitudinal axis 54 of the tapered segment 16 and are spaced at different distances from the longitudinal axis 54. Preferably, wall 20 is spaced further from the longitudinal axis 54 than wall 21. Moreover, the apex 26 of the score 22 within side wall 21 projects to about the longitudinal axis 54 of the tapered segment 16. In an embodiment where the length "h" of the shaft is 36.7 millimeters (1.443 inches), wall 21 is space at a distance "k" of about 1.4 millimeters (0.055 inch) from longitudinal axis 54.

It has been determined that having side wall 21 spaced closer to the longitudinal axis 54 than side wall 20 reduces the amount of material required to produce the fastener 10 without compromising its integrity. As will be appreciated by those skilled in the art, side wall 21 transfers relatively very little force to the tip 18 of the fastener 10 as it is driven into a flooring workpiece because of the score 22 projecting within the wall 21. Accordingly, material used in manufacturing the fastener 10 can be saved by reducing the distance that side wall 21 extends from axis 54.

As stated above and shown in FIG. 2, fastener 10 has a uniform preferred thickness "d" from the head 38 and along shank 12. The score 22 provides for easy recognition of fasteners having the desired thickness.

For a fastener 10 having a shank length "h" of approximately 36.7 millimeters (1.443 inches), thickness "d" is preferably about 0.9 millimeter (0.035 inch). However, in alternative embodiments, the length "h" of the fastener 10 can be 31.8 millimeters (1.25 inches), 25.4 millimeters (1 inch), or 19.1 millimeters (¾ inch). Further, the fastener 10 can have a thickness "d" of about 1.3 millimeters (0.050 inch).

It has been found that reducing the thickness "d" of the fastener 10, with respect to that of conventional fasteners, significantly reduces the probability that the tongue of a laminate flooring workpiece will spilt when the fastener is driven therein. As stated above, these laminate workpieces are likely to spilt because they are brittle and have a thicknesses of only ½, ⅜, and 5/16 inch. Further, the core forming the tongue within these laminate workpieces has very little strength for retaining a fastener.

It has also been found that reducing the thickness "d" of the fastener 10 corresponds in a like reduction in the size of the dimples formed on the outer surface of the tongue caused by displacing the material within the flooring by driving the fastener into it. As stated above, the addition of score 22 also assists in reducing the size of the dimples by allowing displaced flooring material to expand into the score once the fastener 10 has been sunk therein.

The score 22 also provides for easy removal of the head member 38 if the fastener 10 is not properly sunk within a flooring workpiece. Forming the score 22 within shaft segment 12 results in a throat or separation region 56 between the head member 38 and the shank tapered segment 16. The throat 56 has a smaller cross-sectional diameter than the rest of the shank's shaft segment 14. Accordingly, the throat 56 is the weakest portion of the shaft segment 14 and facilitates separation of the head member 38 from the fastener.

Preferably, if head member 38 improperly protrudes from a flooring workpiece after being driven therein, the head member can be removed by breaking it from the shank 12 at throat 56. This is accomplished by grasping onto the head member 38 with pliers or the like and rocking it back and forth until the material forming the throat 56 separates due to metal fatigue.

As shown in FIG. 3, the fastener 10 is preferably used in a conventional air or electric pneumatic nailer 58 adapted for driving fasteners with a desired thickness of, for example, 0.9 millimeter (0.035 inch). Alternatively, the fastener 10 can be used with a rachet or plunger-type nailer.

The nailer 58 includes an attached clip 60 for containing a plurality of fasteners and a foot 62 adapted to simultaneously rest against the top 64 and the tongue side 66 of a laminate flooring workpiece 68 such as a plank or like. When activated by a user, the nailer 58 provides for injecting fastener 10 into flooring 68 at, for example, an angle of about four-five degrees relative to the subfloor 70. The fastener 10 is driven into flooring workpiece 68 having a tongue 72 that, for instance, is sandwiched and partially extends from top and bottom layers 74 and 76, respectively.

As shown in FIG. 3, the fastener 10 can be dimensioned to extend through the workpiece 68 and into subfloor 70. Preferably, in this embodiment, shaft 14 extends into the workpiece 68. Further, the tapered segment 16 and a fraction of the shaft 14 are sunk into the subfloor 78.

Turning to FIG. 4, the clip 60 of the nailer 58 is adapted for receiving those fasteners having a desired thickness and rejecting all others. As stated previously, the score 22 provides for easy recognition of fasteners having the desired thickness.

As will be appreciated by those skilled in the art, inserting fasteners having too large or small of a thickness for the nailer can cause jamming, damage the flooring, and possibly injure the operator. Accordingly, improperly sized fasteners lacking a score 22 in the shank 12 are prevented by key 78 from being inserted into the clip 60 of the nailer 58.

Clip 60 is preferably of unitary construction and is made or a metal or a metal alloy. Clip 60 includes an elongated wall 80 attached to an upper beam 82 and a lower beam 84 that are in spaced parallel relationship to each other. The upper beam 82 has a channel 86 adapted for receiving the head member 38 of the fastener 10 and at least a portion of shank 12. The channel 86 forms a wall surface 88 within the upper beam 82 that is coplanar with, an partially opposes, wall 80. The lower beam 84 also has a channel 90 adapted for receiving at least a portion of the shank tapered segment 16.

Key 78 longitudinally extends on the outer face of wall 80 and projects towards wall 88. The key 78 is adapted to be received within the score 22 of the fastener 10. The distance between the apex 92 of the key 78 and wall surface 88 limits the size of the fastener throat 56 that can be received between the key and wall 88. Accordingly, only fasteners with score 22, indicating that they have a thickness suitable for used with the nailer 58, can be inserted within clip 60.

While the specific embodiments have been illustrated and described, numerous modifications come to mind without significantly departing from the spirit of the invention and the scope of protection is only limited by the scope of the accompanying claims.

What is claimed is:

1. A fastener for securing a laminate flooring workpiece comprising:

a unitary shank of preselected length and thickness including a shaft segment and a tapered segment, the shaft segment having a substantially rectangular cross- section with a first side and a second side in parallel spaced relationship to each other, the first side having a score formed therein and adapted to receive a key operably attached to a nailer, and the tapered segment having a tip for penetrating the workpiece; and a head member integrally attached and extending from the shank segment.

2. A method of securing a laminate flooring to a subfloor with one or more fasteners having a unitary shank of preselected length and thickness including a shaft segment and a tapered segment, the shaft segment having a substantially rectangular cross-section with a first side and a second side in parallel spaced relationship to each other, the first side having a score formed therein, and the tapered segment having a tip for penetrating the workpiece, and a head member integrally attached and extending from the shank segment, the method comprising the steps of:

providing a nailer with an attached clip;

providing a plurality of the fasteners having a unitary shank of preselected length and thickness including a shaft segment and a tapered segment, the shaft segment having a substantially rectangular cross-section with a first side and a second side in parallel spaced relationship to each other, the first side having a score formed therein, and the tapered segment having a tip for penetrating the workpiece, and a head member integrally attached and extending from the shank segment;

receiving the fasteners with the clip;

limiting the thickness of the fasteners received by the clip with a key attached to the clip;

protruding the key into the scores of the fasteners received by the clip;

placing the nailer against the flooring; and driving with the nailer at least one of the fasteners from the clip into the flooring.

3. The method of claim 2 further comprising the step of breaking the head member from at least one of the fasteners driven into the flooring at a throat region between the head member and the tapered segment.

4. A fastener comprising:

a unitary shank of preselected length and thickness having a shaft segment and a tapered segment, the shaft segment having a first side with a score formed therein and a second side, the tapered segment having a tip and a longitudinal axis that extends between the first and second sides of the shaft segment with the first side being closer to the longitudinal axis than the second side; and a head member integrally attached and perpendicularly extending from the shank.

5. The fastener of claim 4 wherein the score has an apex that extends to about the longitudinal axis.

6. The fastener of claim 5 wherein the thickness of the shank is about 0.035 inch.

7. The fastener of claim 6 wherein the shank has a length of about 1.443 inches.

8. A fastener for securing a laminate flooring workpiece comprising:

a unitary shank of preselected length and thickness including a shaft segment and a tapered segment, the shaft segment having a first side and a second side in parallel spaced relationship to each other, the first side having a score formed therein, and the tapered segment having a tip for penetrating the workpiece;

a head member integrally attached and extending from the shank; and at least one barb projecting from at least one side of the tapered segment.

9. The fastener of claim 8 wherein the head member perpendicularly extends from the shaft segment.

10. The fastener of claim 9 wherein the tapered segment has a longitudinal axis that extends between the first and second sides with the first side being closer to the longitudinal axis than the second side.

11. The fastener of claim 10 wherein the score has an apex that extends to about the longitudinal axis.

12. The fastener of claim 11 wherein the score is adapted to receive a key operably attached to a nailer.

13. A method of securing a laminate flooring to a subfloor with one or more fasteners of claim 12 comprising the steps of:

providing a nailer with an attached clip;
providing a plurality of the fasteners of claim 12;
receiving the fasteners with the clip;
limiting the thickness of the fasteners received by the clip with a key attached to the clip;
protruding the key into the scores of the fasteners received by the clip;
placing the nailer against the flooring; and
driving with the nailer at least one of the fasteners from the clip into the flooring.

* * * * *

UNITED STATES PATENT AND TRADEMARK OFFICE
CERTIFICATE OF CORRECTION

PATENT NO.    : 6,139,238
DATED         : October 31, 2000
INVENTOR(S)   : David A. Anstett It is certified that error appears in the above-identified patent and that said Letters Patent is hereby corrected as shown below:

Column 1,
Line 40, delete first "," and insert therefor -- . --

Column 7,
Line 7, delete "Claim 9" and insert therefor -- Claim 8 --
Line 13, delete "Claim 11" and insert therefor -- Claim 8 --

Column 8,
Line 2, delete "Claim 12" and insert therefor -- Claim 8 --
Line 5, delete "Claim 12" and insert therefor -- Claim 8 --

Signed and Sealed this

Sixth Day of November, 2001

Attest:

NICHOLAS P. GODICI
*Attesting Officer*   *Acting Director of the United States Patent and Trademark Office*